United States Patent [19]
Atchley

[11] 3,738,326

[45] June 12, 1973

[54] FEEDER PEN FOR CALVES

[76] Inventor: Oscar J. Atchley, P. O. Box 147, Evansville, Ill. 62242

[22] Filed: May 13, 1971

[21] Appl. No.: 142,889

[52] U.S. Cl. .................................. 119/20, 119/53
[51] Int. Cl. ............................................ A01k 01/00
[58] Field of Search ................. 119/20, 15, 19, 21, 119/53, 58

[56] References Cited
UNITED STATES PATENTS

| | | | |
|---|---|---|---|
| 3,043,265 | 7/1962 | Atchley | 119/20 |
| 1,127,712 | 2/1915 | Wrenn | 119/21 |
| 364,557 | 6/1887 | Walin | 119/53 X |
| 2,969,769 | 1/1961 | Paschall | 119/53 X |
| 2,005,188 | 6/1935 | Hedrick | 119/53 |
| 1,427,021 | 8/1922 | Rudolph | 119/53 |

Primary Examiner—Louis G. Mancene
Assistant Examiner—James H. Czerwonky
Attorney—Clarence A. O'Brien and Harvey B. Jacobson

[57] ABSTRACT

An enclosure for containing animals to be fed defining a plurality of generally sector shaped confinement zones spaced circumferentially about and radiating outwardly from a central feeding station in which either a dry feeder or a liquid feeder may be positioned. Each confinement zone includes a shed type enclosure occupying only a portion of the corresponding confinement zone and each shed enclosure includes a door which may be opened to afford movement of each confined animal throughout the entire confinement zone, both inside and outside his shed. The adjacent sides of the zones are separated and defined by partitions radiating outwardly from the feeding station and the radial innermost end portions of at least two adjacent partitions may be slidably retracted generally radially outwardly of the central feeding station to allow removal of the feeder in use in a direction generally radially of the feeder station. The outermost ends of at least some sections are hinged at one end and also have a slidably mounted, hinged gate member at their other end. The feeder is mounted below an adjustable food supply means.

15 Claims, 10 Drawing Figures

PATENTED JUN 12 1973 3,738,326

Oscar J. Atchley
INVENTOR.

BY Clarence A. O'Brien
and Harvey B. Jacobson
Attorneys

Oscar J. Atchley
INVENTOR.

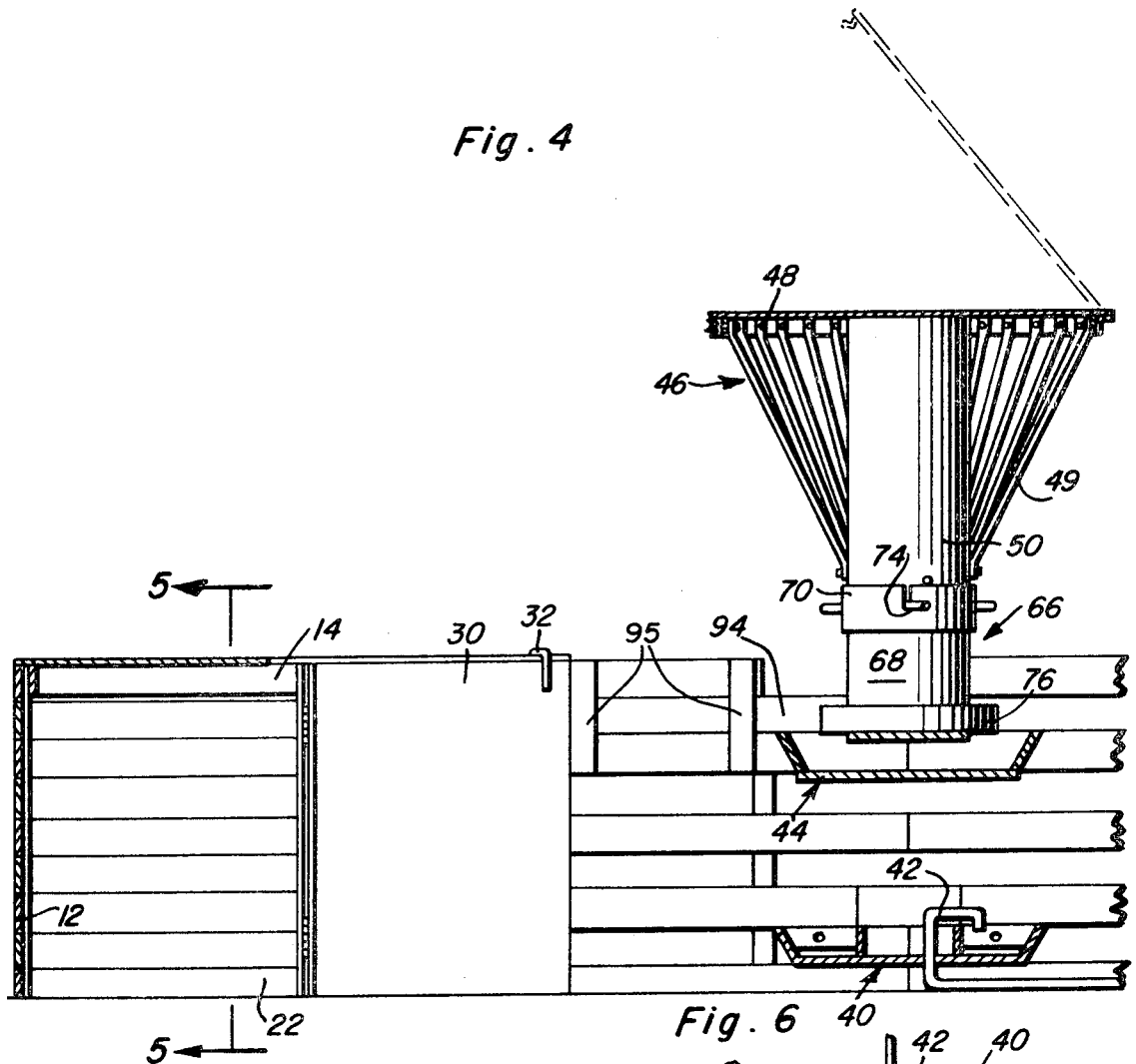
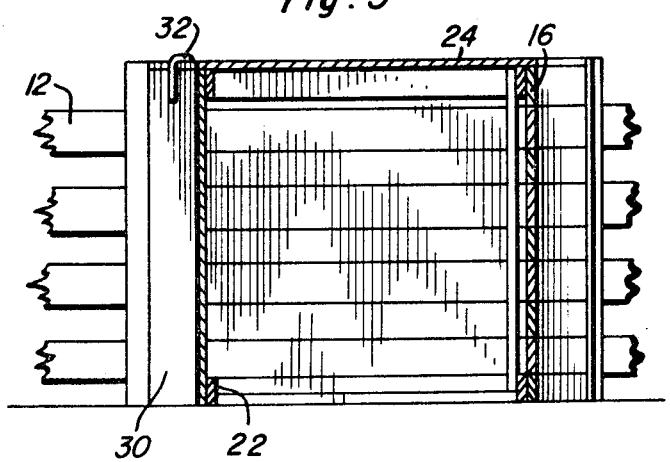
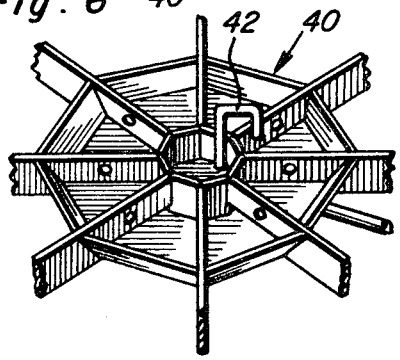
Oscar J. Atchley
INVENTOR.

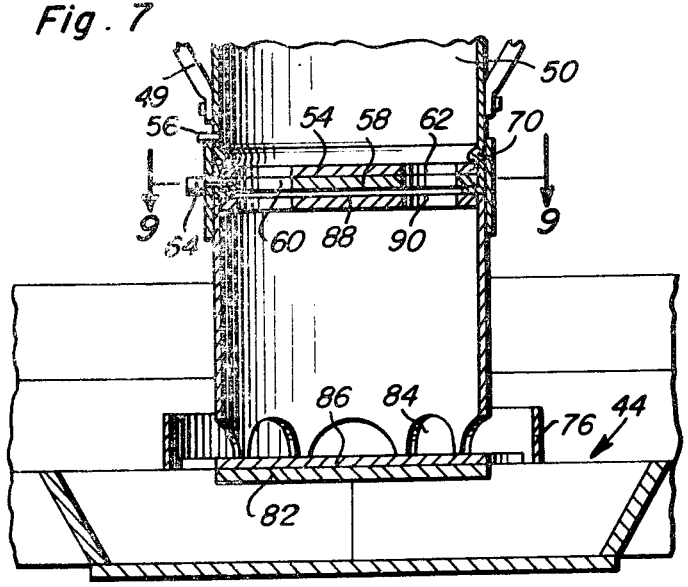
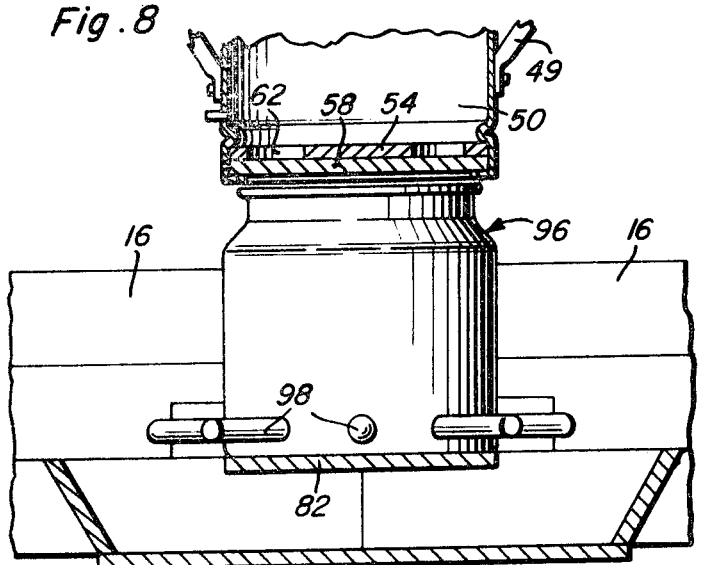
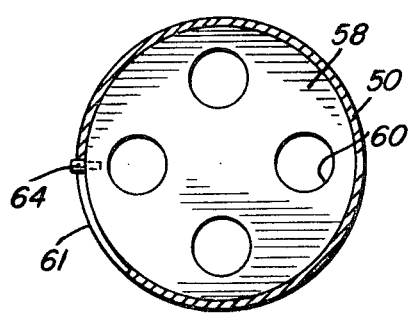
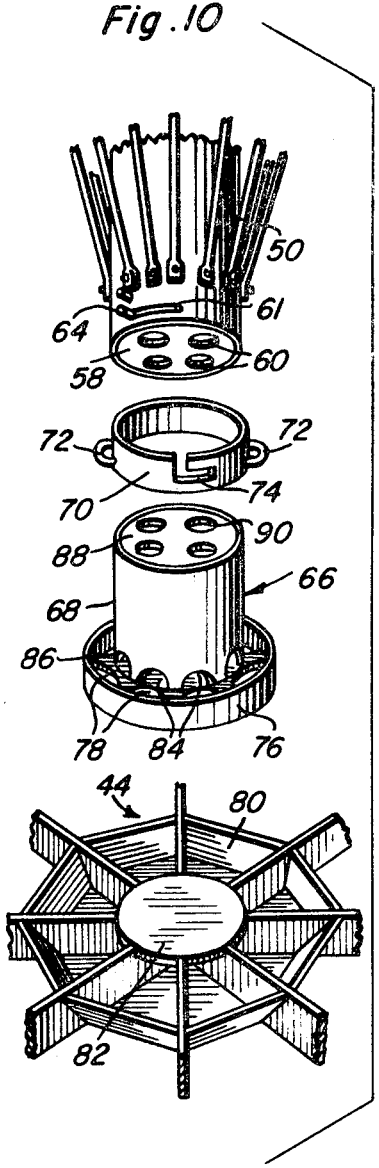
Oscar J. Atchley
INVENTOR.

FEEDER PEN FOR CALVES

The feeder pen of the instant invention has been primarily designed for use in segregating, confining and feeding calves and comprises an improvement over the pen disclosed in my prior U.S. Pat. No. 3,043,265, dated July 10, 1962. The feeder pen provides a confinement zone and shelter house or shed for each calf and has been designed to provide shelter for the baby calf from its first eight weeks of age. The pen is constructed in a manner whereby warmth is afforded when the pen is utilized in cooler climates and shade may be provided when the pen is used in warmer climates.

The main object of this invention is to provide a feeding pen which will enable a stockman to efficiently start and raise young stock.

Another object of this invention is to provide an apparatus which will enable a stockman to start calves on liquid feed, make a smooth transition to solid feed and to continue with the feeding of calves with solid feed as long as may be desired.

Another important object of this invention is to provide a feeder pen for calves which may be readily manipulated to afford warm shelter on cold days and fresh air and sunshine on warmer days as well as shelter and air circulation on hot days.

Another object of this invention is to provide a feeder pen for calves constructed in a manner whereby liquid and dry feed for a plurality of calves may be changed at will and with little effort whenever desired.

Still another object of this invention is to provide a feeder pen in accordance with the preceding objects constructed in a manner whereby a plurality of calves may be properly housed and confined in a relatively small plan area.

Another object of this invention is to provide a feeder pen for calves constructed in a manner whereby the pen may be adjusted so that calves disposed outside the pen may readily enter a portion thereof closed from the remaining portions of the pen and feed on either liquid or dry food.

Still another object of this invention is to provide a feeder pen in accordance with the preceding objects constructed in a manner whereby a selected calf within the pen may be removed therefrom without any danger of other calves within the pen escaping.

A final object of this invention to be specifically enumerated herein is to provide a feeder pen for calves which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts, throughout, and in which:

FIG. 4 is a fragmentary vertical sectional view taken substantially upon a plane passing through the center of the feeder pen;

FIG. 5 is a fragmentary vertical sectional view taken substantially upon the plane indicated by the section line 5—5 of FIG. 4;

FIG. 6 is a perspective view of the lower watering trough portion of the central feeding station;

FIG. 7 is an enlarged fragmentary vertical sectional view taken substantially upon a plane passing through the center of the feeding pen and illustrating the upper dry feeder in operative position;

FIG. 8 is an enlarged fragmentary vertical sectional view similar to FIG. 7 but illustrating the liquid feeder in operative position;

FIG. 9 is a fragmentary horizontal sectional view taken substantially upon the plane indicated by the section line 9—9 of FIG. 7; and FIG. 10 is an exploded perspective view of the dry feeder of the instant invention with the extreme uppermost and lowermost portions thereof only fragmentarily illustrated.

Figure 1:
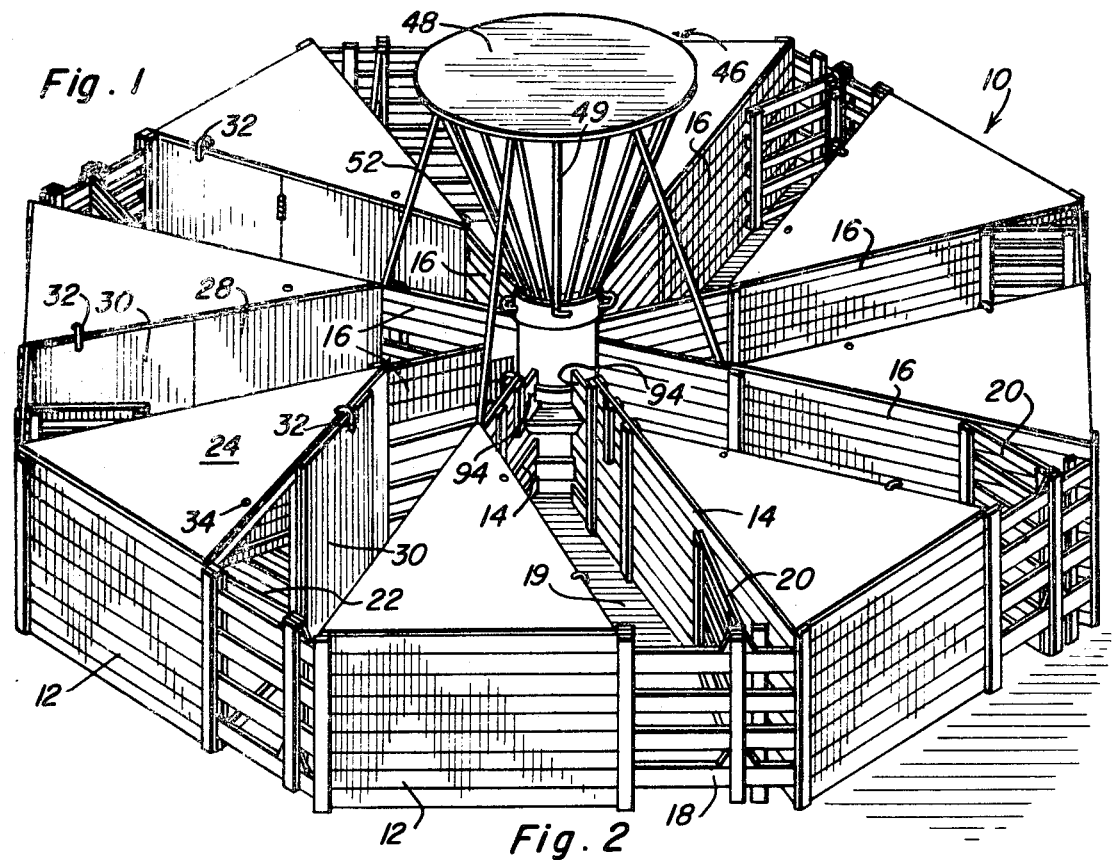
FIG. 1 is a perspective view of the feeder pen.

Referring now more specifically to the drawings, the numeral 10 generally designates the feeder pen of the instant invention. The feeder pen 10 is generally circular in configuration but its outer periphery is defined by 8 generally straight and relatively angulated walls or panel sections 12 with each pair of adjacent walls 12 being similarly relatively angulated. Accordingly, the pen 10 is octagonal in plan shape, although it is to be understood that any convenient number of sides may be utilized in the construction of the pen 10. In addition, the pen 10 includes 8 generally radial partition walls 14 and 16 radiating outwardly from a central feeding station defined between the spaced apart radial innermost ends of the partitions 14 and 16. The radial outermost ends of the partitions 14 and 16 have the panel sections 12 hingedly secured thereto as at 17 for swinging about upstanding axes and the panel sections 12 are substantially solid throughout two-thirds of their length from the hinged edge portions thereof and in the form of a board type fence throughout the free swinging end portions thereof which extend approximately one-third the length of the panel sections 12. In addition, each of the free swinging end portions 18 of the panel sections 12 has a short gate section 20 slidably and swingably supported therefrom.

A confinement zone 19 is defined between each pair of adjacent partitions 14 and 16 and one outer triangular corner portion of each confinement zone includes a slatted triangular floor construction 22 over which a triangular roof panel 24 is supported in vertically spaced relation relative thereto. The roof panels 24 are supported from the floor constructions 22 by means of upstanding supports 26 and each floor construction 22 and its companion roof panel 24 defines a shed type enclosure whose outer side is closed by the solid wall portion of the corresponding wall or panel section 12. In addition, another side of the triangular shed type enclosure defined by each floor construction 22 and roof panel 24 is closed by one of the corresponding partitions 14 and 16 and the third side of the shed type enclosure includes a partial stationary wall 28 and a hinged door 30 supported from the corresponding stationary wall 28 by any suitable hinges (not shown). Accordingly, each shed type enclosure may be fully closed by swinging the door 30 to the closed position, in which position it may be retained by the utilization of a U-bolt 32 inserted downwardly through an aperture 34 provided in the corresponding roof panel 24. On the other hand, the door 30 may be secured in the open position by removal of the aforementioned U-bolt and its insertion through an aperture 36 formed in the corresponding roof panel 24. Of course, when the door 30 is retained in the open position, a calf within the shed type enclosure may readily exit therefrom into the outside portion of the corresponding confinement zone defined between the corresponding pair of adjacent partitions 14 and 16.

Figure 3:
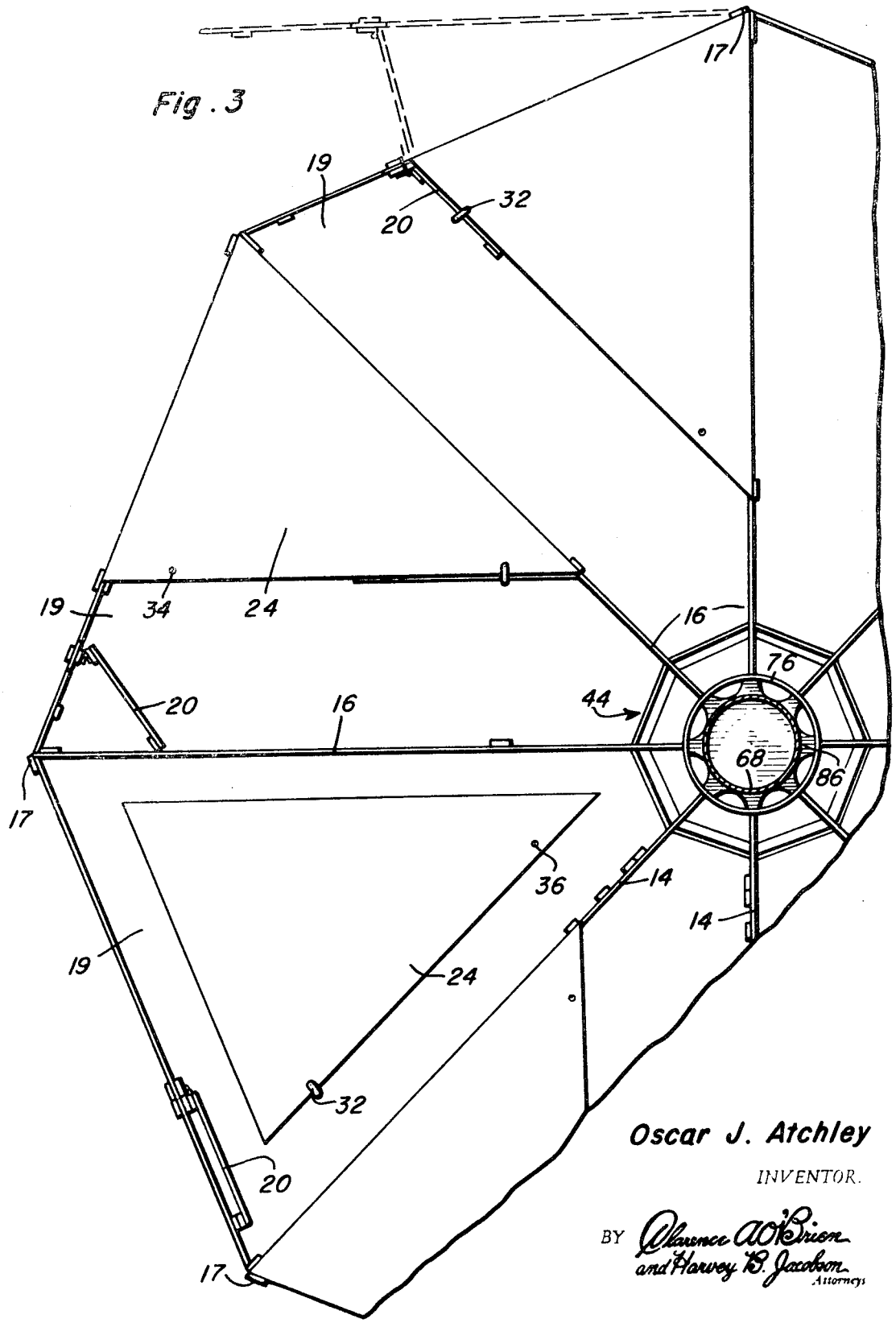
FIG. 3 is a fragmentary top plan view of the feeder pen with one of the peripheral wall portions thereof illustrated in an open position in phantom lines enabling access to the central feeding area of the pen from outside the latter.

From the upper portion of FIG. 3 of the drawings, it may be seen that any one of the walls or panel sections 12 may be swung to the open position thereof illustrated in phantom lines and that the door 30 of the associated shed type enclosure may be secured in the closed position by the insertion of the U-bolt 32 in the outermost aperture 34. Also, the gate section 20 may be slid along the fence section end portion 18 of the open wall or panel section 12 and latched, in any convenient manner (not shown), to the free end of the solid portion of the open wall or panel section 12. In this manner, although the outer side of the shed type enclosure has been opened by swinging the corresponding wall or panel section 12 to the open position illustrated in phantom lines in the upper portion of FIG. 3, that open portion of the pen disposed outwardly of the shed type enclosure is closed by the corresponding gate structure 20 extending between the wall or panel section 12 shifted to the open position and the adjacent corner of the shed type enclosure.

With any one of the walls or panel sections 12 shifted to the open positions thereof illustrated in phantom lines in FIG. 3, access to the central feeding station disposed between the radial innermost ends of the partitions 14 may be gained by a stockman or by other calves disposed outside the pen without any calf being removed from the pen or having access to the area outside the pen panel sections 12.

With reference now more specifically to FIGS. 4 and 6 of the drawings, it may be seen that an octagonal watering trough referred to in general by the reference numeral 40 is supported from and between the lower portions of the radial innermost ends of the partitions 14 and 16. The watering trough 40 includes a supply pipe 42 through which water may be supplied to the watering trough 40 either manually or by automatic means (not shown). Also, a dry feed trough referred to in general by the reference numeral 44 is also supported from the radial innermost ends of the partitions 14 and 16 above the watering trough 40 and the dry feed trough 44 is also octagonal in configuration.

Supported above the dry feed trough 44 and the upper marginal edge portions of the partitions 14 and 16 is a hay bowl assembly referred to in general by the reference numeral 46. The hay bowl assembly 46 includes a hinged top 48 and is generally inverted conical in configuration and includes a plurality of downwardly convergent hay retaining bars 49 secured at their lower ends to peripherally spaced portions of a central support tube which extends upwardly through the center of the bowl 46. A plurality of upwardly convergent braces 52 are secured between the partitions 14 and 16 and circumferentially spaced portions of the upper end of the hay bowl assembly 46 and thereby rigidly support the latter above the central area of the pen 10. Loose hay may be disposed in the hay bowl assembly exteriorly of the tube 50 and within the confines of the bars 49. Further, dry feed may be stored within the support tube 50 whose upper end is open.

The lower end of the support tube 50 has a perforated register plate 54 secured therein and an abutment pin 56 is provided on at least one side of the support tube 50 adjacent its lower end and projects radially therefrom.

The register plate 54 is recessed upwardly within the lower end of the support tube 50 and a circular metering plate 58 is rotatably secured in the extreme lower end of the tube 50 immediately below the plate 54. The metering plate 58 has a plurality of apertures 60 formed therein which may be moved into or out of registry with the apertures 62 formed in the register plate 54 and the tube 50 has a circumferential slot 61 formed therein through which a radial actuating pin 64 carried by the metering plate 58 extends and is slidably received.

Both the plates 54 and 58 are secured within the lower end of the tube 50 against downward shifting relative thereto and the plate 54 is stationary whereby the plate 58 may be oscillated between the limits defined by the opposite ends of the slot 61. In one limit position of oscillation the apertures 60 of the plate 58 are registered with the apertures 62 of the plate 54 and in the other limit position of the plate 58, the apertures 60 are fully out of registry with the apertures 62.

A dry feed hopper referred to in general by the reference numeral 66 is provided and includes an upstanding tubular body 68 over which a combined register and operating sleeve 70 is telescoped for rotation relative to the body 68. The collar 70 is provided with opposite side handles 72 and a J-shaped slot 74 in which the pin 64 is receivable.

The lower end of the hopper is provided with an apertured annular tray 76 having outer peripheral openings 78 spaced thereabout in registry with the compartments 80 of the octagonal dry feed trough 44. The central portion of the dry feed trough 44 includes an upper abutment plate 82 upon which the underside of the tray 76 is positionable and the lower end of the tubular body 68 of the hopper 66 includes eight peripherally spaced openings 84 in registry with the openings 78 which are in turn registered with the compartments 80. When the collar 70 is shifted downwardly along the body 68, it rests upon the bottom wall 86 of the tray 76 in which the openings 78 are formed and lies in registry with, and so as to close, the openings 84. Furthermore, the upper end of the tubular body 68 has an upper end wall 88 secured therein provided with apertures 90 which are registerable with the apertures 62.

The spacing between the lower end of the tube 50 and the abutment 82 is only slightly greater than the height of the dry feed hopper 66 and in this manner, when the dry feed hopper 66 is positioned between the abutment 82 and the lower end of the tube 50, the undersurface of the plate 58 immediately overlies the upper surface of the plate or upper wall 88 of the body 68 of the hopper 66.

When the hopper 66 is in position such as that illustrated in FIG. 7 of the drawings, if it is desired to discharge dry feed from the tube 50 into the dry feed hopper 66 and subsequently into the dry feed trough 44, the collar 70 is slid upwardly along the body 68 until the pin 64 is received in the open upper end of the vertical leg of the slot 74. Then, as the upper end of the collar abuts the pin 56, the pin 64 will be received in the lower horizontal leg of the slot 74 and the collar 70 may thereafter be rotated in order to cause the plate 58 to rotate and the apertures 60 thereof to be registered with the apertures 62 formed in the plate 54 whereby dry feed within the tube 50 will flow downwardly through the apertures 62, 60 and 90 and into the body 68 of the dry feed hopper 66 for subsequent movement outwardly through the openings 84, downwardly through the openings 78 and into the compartment 80 of the dry feed trough 44. When it is desired to shut off the supply of dry feed, the collar 70 is merely rotated in the opposite direction so as to also rotate the plate 58 in the opposite direction and move the openings 60 out of registry with the openings 62 whereby the movement of dry feed from the tube 50 into the hopper 60 will be terminated. Then, should it be desired to remove the hopper 66, the collar 70 is rotated so that the pin 64 is registered with the vertical leg of the slot 74 and the collar 70 is allowed to slide downwardly along the body 68 so as to be registered with and close the openings 84 of the body 68. Thereafter, the dry feed hopper 66 may be removed from between the lower end of the support tube 50 and the abutment 82 in a manner to be hereinafter more fully apparent.

Figure 2:
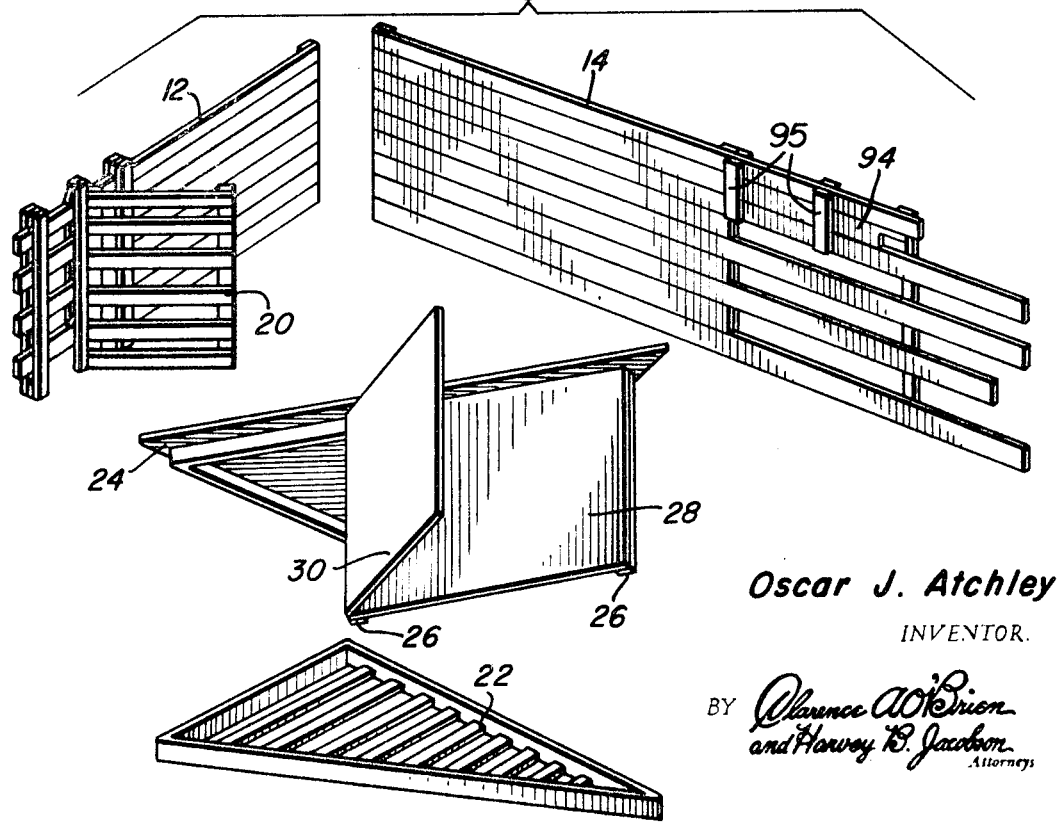
FIG. 2 is an exploded perspective view of several components of the feeder pen which make up an individual confinement zone thereof.

In order to allow horizontal withdrawal of the dry feed hopper 66 from between the radial innermost ends of the partitions 14 and 16, the partitions 14 include radially shiftable upper inner end portions 94, see FIGS. 2 and 4, that have opposite side upstanding guide members 95 secured to opposite sides of portions 94 and which guidingly support the inner end portions 94 for limited reciprocal movement from the partitions 14 and 16. The inner end portions 94 may be shifted radially outwardly from the central feeding station occupied by the dry feed hopper 66. As shown in FIG. 2, end portion 94 is in its slidably retracted, radially outward position. Then, the dry feed hopper 66 may be horizontally withdrawn toward the retracted portions of the partitions 14 and subsequently lifted out of the pen 10. In FIG. 4, end portion 94 is shown in its normal, inwardly displaced position abutting hopper 66.

Referring now more specifically to FIG. 8 of the drawings, there may be seen a liquid feeder referred to in general by the reference numeral 96 and which is similar to the liquid feeder disclosed in my above mentioned prior U.S. Pat. No. 3,043,265. The liquid feeder 96 is of substantially the same but slightly less vertical height as the dry feed hopper 66 and includes lower end radially outwardly projecting nipples 98. There are eight nipples spaced about the lower periphery of the liquid feeder and accordingly, each nipple projects into one of the confinement zones defined between adjacent pairs of partitions 14 and 16. After the dry feed hopper 66 has been removed, the liquid feeder 96 may be positioned in its place and the retractible portions 94 of the partitions 14 may again be shifted toward their radial innermost positions thereby preventing withdrawal of the liquid feeder 96 until the shiftable portions 94 of the partitions 14 are again radially shifted outwardly.

Of course, when the dry feed hopper 66 is removed, a certain quantity of dry feed remains within the compartments 80 of the dry feed trough 44. In this manner, a calf within any one of the confinement zones defined between adjacent pairs of partitions 14 and 16 may feed either on dry feed or liquid feed from the nipples 98.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A feeder pen for animals including means defining a central feeding station, a feed container supported at said feeding station, more than two partition walls extending generally radially outwardly from said feeding station, and a plurality of peripheral wall sections extending between the outermost ends of adjacent pairs of partition walls, at least some of said peripheral wall sections each being hingedly supported from the radial outermost end of one of the corresponding partition walls, the free swinging end portion of at least some of said hinged peripheral wall sections including gate members, said gate members being slidably supported from the free swinging end portions for movement therealong and swinging movement relative thereto about upstanding axes, said gate members being disposed on the inner sides of said peripheral wall sections.

2. A feeder pen for animals including means defining a central feeding station, a feed container supported at said feeding station, more than two partition walls extending generally radially outwardly from said feeding station, and a plurality of peripheral wall sections extending between the outermost ends of adjacent pairs of partition walls, at least some of said peripheral wall sections each being hingedly supported from the radial outermost end of one of the corresponding partition walls, said feed container being horizontally removable from said feeding station, the innermost ends of said partition walls embracingly receiving said feed container therebetween, the innermost end portion of at least one of said partition walls in horizontal registry with said feed container and being slidably supported for radial outward retraction for easy access to and horizontal removal of said feed container.

3. A feeder pen for animals including means defining a central feeding station, a feed container supported at said feeding station, more than two partition walls extending generally radially outwardly from said feeding station, and a plurality of peripheral wall sections extending between the outermost ends of adjacent pairs of partition walls, at least some of said peripheral wall sections each being hingedly supported from the radial outermost end of one of the corresponding partition walls, each pair of adjacent pair of partition walls having a confinement zone therebetween, at least some of said confinement zone having a shed type enclosure disposed therein, each enclosure comprising an upstanding stationary wall means extending from one of said partition walls, intermediate its opposite ends, to the peripheral wall closing the outer end of said confinement zone, each stationary wall means generally paralleling the other partition wall of said confinement zone, each stationary wall means having an exit and entrance opening formed therein with which a closable door is operatively associated, whereby the animal in each confinement zone may be closed within the corresponding enclosure.

4. A feeder pen for animals including means defining a central feeding station, a feed container supported at said feeding station, more than two partition walls extending generally radially outwardly from said feeding station, and a plurality of peripheral wall sections extending between the outermost ends of adjacent pairs of partition walls, said feeding station including a raised stationarily supported dry feed hopper provided with downwardly opening valved outlets and a lower support portion spaced vertically below said outlets, said feed container including an upwardly opening inlet and being positionable on said support portion immediately below said valved outlets with the latter registered with said inlet, said container also including lower peripherally spaced outlets.

5. The combination of claim 4 wherein said pen includes dry feed trough portions disposed below and in vertical registry with said feed container outlets.

6. The combination of claim 5 including a collar slidably disposed on said container for up and down shifting therealong, said collar, when in a lower position on said container, being in registry with said outlets and closing the latter.

7. The combination of claim 6 wherein said collar is also rotatably disposed on said container, said valved outlet including a rotary valve actuator, said collar including means for engagement with said actuator upon raising of said collar on said container and operative to rotate said actuator in response to rotation of said collar on said container when said collar is in a raised position.

8. A feed pen for animals including means defining a central feeding station, a horizontally removable feed container supported at said feeding station, more than two partition walls extending generally radially outwardly from said feeding station with the innermost ends of said walls embracingly receiving said feed container therebetween, a plurality of peripheral wall sections extending between the outermost ends of adjacent pairs of said partition walls, the innermost end portion of at least one of said partition walls in horizontal registry with said feed container and being slidably supported for radial outward retraction for easy access to and horizontal removal of said feed container.

9. The combination of claim 8 wherein said peripheral wall sections are each hingedly supported from the radial outermost end of one of the corresponding partition walls.

10. The combination of claim 9 wherein the free swinging end portion of at least some of said peripheral wall sections include gate members, said gate members being slidably supported from the free swinging end portions for movement therealong and swinging movement relative thereto about upstanding axes, said gate members being disposed on the inner sides of said peripheral wall sections.

11. The combination of claim 9 wherein each pair of adjacent pair of partition walls defined a confinement zone therebetween, at least some of said confinement zone having a shed type enclosure disposed therein including an exit and entrance opening with which a closable door is operatively associated, whereby the animal in each confinement zone may be closed within the corresponding enclosure, said enclosure being of smaller plan area than the confinement zone in which it is disposed with said exit and entrance openings opening outwardly of said enclosure into the portion of said confinement zone not occupied by said enclosure.

12. The combination of claim 8 wherein said peripheral wall sections each are hingedly supported from the radial outermost end of one of the corresponding partition walls.

13. The combination of claim 8 wherein said peripheral wall sections are each hingedly supported from the radial outermost end of one of the corresponding partition walls, the free swinging end portion of at least some of said peripheral wall sections including gate members, said gate members being slidably supported from the free swinging end portions for movement therealong and swinging movement relative thereto about upstanding axes, said gate members being disposed on the inner sides of said peripheral wall sections.

14. The combination of claim 8 wherein said peripheral wall sections each are hingedly supported from the radial outermost end of one of the corresponding partition walls, each pair of adjacent partition walls defining a confinement zone therebetween, at least some of said confinement zone having a shed type enclosure disposed therein including an exit and entrance opening with which a closable door is operatively associated, whereby the animal in each confinement zone may be closed within the corresponding enclosure, said enclosure being of smaller plan area than the confinement zone in which it is disposed with said exit and entrance openings opening outwardly of said enclosure into the portion of said confinement zone not occupied by said enclosure.

15. The combination of claim 4 wherein said peripheral wall sections each are hingedly supported from the radial outermost end of one of the corresponding partition walls.

* * * * *